United States Patent [19]

Urata

[11] Patent Number: 4,898,225

[45] Date of Patent: Feb. 6, 1990

[54] MOLD LUBRICANT EXHAUSTING APPARATUS FOR KNOCKING-OUT MECHANISM

[75] Inventor: Chieo Urata, Ishikawa, Japan

[73] Assignee: Kabushiki Kaisha Komatsu Seisakusho, Tokyo, Japan

[21] Appl. No.: 290,046

[22] PCT Filed: Mar. 31, 1988

[86] PCT No.: PCT/JP88/00329

§ 371 Date: Nov. 30, 1988

§ 102(e) Date: Nov. 30, 1988

[87] PCT Pub. No.: WO88/07420

PCT Pub. Date: Oct. 6, 1988

[30] Foreign Application Priority Data

Apr. 1, 1987 [JP] Japan ............................ 62-49763[U]

[51] Int. Cl.[4] ............................................. B29C 33/44

[52] U.S. Cl. .................................... 164/158; 164/347; 184/6

[58] Field of Search .................... 184/6.14, 6, 24, 55.1; 164/158, 347, 344; 15/302; 134/22.1, 24, 95

[56] References Cited

U.S. PATENT DOCUMENTS

| | | | |
|---|---|---|---|
| 3,538,815 | 11/1970 | Clarke et al. | 184/24 |
| 3,963,209 | 6/1976 | Muller | 164/344 |

FOREIGN PATENT DOCUMENTS

| | | | |
|---|---|---|---|
| 523046 | 3/1956 | Canada | 22/94 |
| 46-20480 | 7/1971 | Japan . | |
| 61-255737 | 11/1986 | Japan . | |
| 62-6751 | 1/1987 | Japan | 164/158 |
| 772707 | 4/1979 | U.S.S.R. | 164/347 |

*Primary Examiner*—Stephen F. Husar
*Assistant Examiner*—Christopher Hayes
*Attorney, Agent, or Firm*—Varndell Legal Group

[57] ABSTRACT

In a mold lubricant exhausting apparatus for a knocking-out mechanism to be installed in a press machine, etc., to prevent the knocking-out mechanism from being damaged due to mold lubricant, overflowed a mold, the apparatus has a nozzle (11) disposed at an end thereof in a reserving chamber (2), and an air pump connected to the base end of the nozzle (11) for supplying air to the nozzle (11) for forcibly exhausting the mold lubricant accumulated in the reserving chamber (2).

3 Claims, 2 Drawing Sheets

MOLD LUBRICANT EXHAUSTING APPARATUS FOR KNOCKING-OUT MECHANISM

BACKGROUND OF THE INVENTION:

This invention relates to a mold lubricant exhausting apparatus for a knocking-out mechanism installed in a press machine, etc.

BACKGROUND ART

A press machine for executing a molding work, such as a drawing work or a mold forging, generally has a knocking-out mechanism to separate a mold from a molded product. The knocking-out mechanism has a knock-out bar in openings formed at a bed and a bolster, and the knock-out bar is vertically moved by means of a linkage of a cam and a lever interlocked to a slide to push out the molded product from the mold.

In a warm forging work by a press machine, a material is worked while diffusing mold lubricant to the mold and the material during the work. The mold lubricant is, for example, a mixture of graphite and water mixed at a predetermined ratio, and to cool the mold and the material during molding and to lubricate a contact portion between the mold and the material.

When the mold lubricant is used during a molding work in the press machine having the knocking-out mechanism as described above, the mold lubricant overflows from the mold and the material through openings defined at the bed and the bolster along the knock-out bar, and is accumulated in the bed. In a conventional exhausting apparatus, a reserving chamber having an exhaust port is provided around the knock-out bar in the bed to temporarily gather the overflowed mold lubricant therein and then exhaust the mold lubricant through the exhaust port.

However, in the exhausting apparatus of a type described above, the graphite in the mold lubricant cannot be completely exhausted but remains in the reserving chamber which is accumulated on the bottom of the reserving chamber. Thus, there is a possibility that the remaining graphite might disturb the exhaust of the mold lubricant from the exhaust port. In such a case, the knock-out bar is dipped in the mold lubricant in the reserving chamber so that the graphite fixes the knock-out bar and members of the bed which otherwise relatively move with respect to one another. When the knockout bar is operated in this state, it might damage the knocking-out mechanism.

SUMMARY OF THE INVENTION

Accordingly, an object of this invention is to provide a mold lubricant exhausting apparatus for a knocking-out mechanism of a press in which all of the above-described difficulties accompanying conventional apparatus have been eliminated, and which can prevent the knocking-out mechanism from being damaged due to the seizure of a reserving chamber and a knock-out bar by mold lubricant.

According to the invention, there is provided a mold lubricant exhausting apparatus for a knocking-out mechanism comprising a nozzle disposed at an end thereof in a reserving chamber, and an air pump connected to a base end of the nozzle for supplying air to the nozzle for forcibly exhausting mold lubricant from the reserving chamber. With this construction, the mold lubricant is prevented from being accumulated in the reserving chamber thereby to eliminate the seizure of the knock-out bar and members of a bed by the mold lubricant and to prevent the knocking-out mechanism from being damaged.

DETAILED DESCRIPTION OF THE INVENTION

The present invention will be described in detail with reference to the accompanying drawings.

Figure 1:
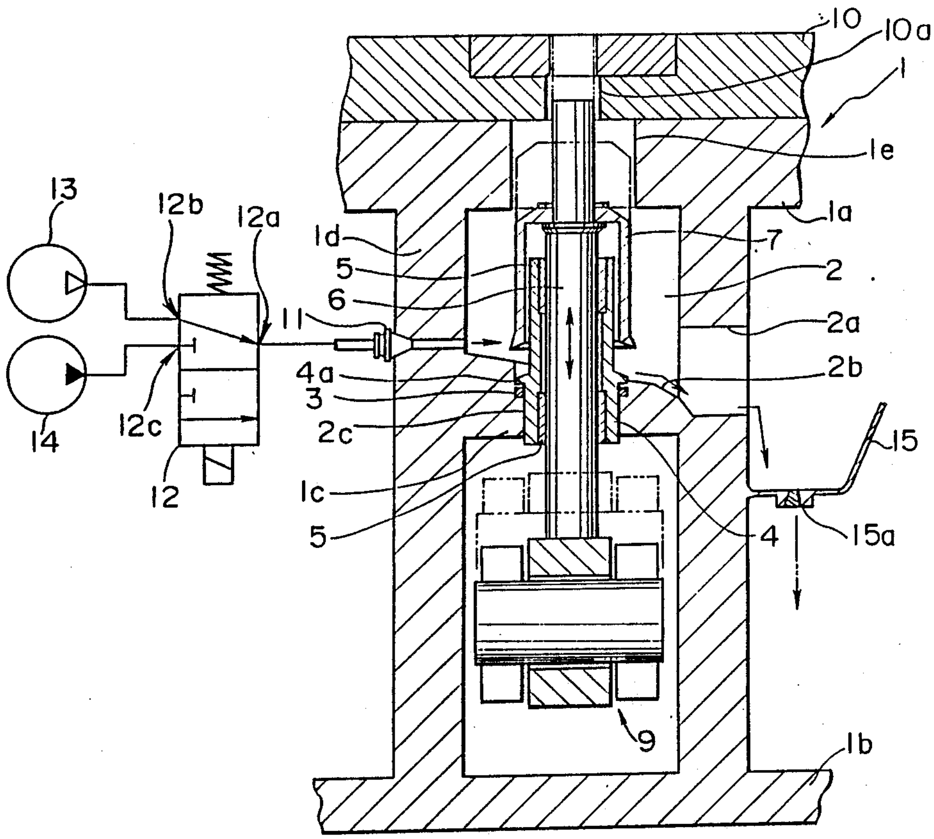
FIG. 1 is a sectional view schematically showing one preferred embodiment of the mold lubricant exhausting apparatus for a knocking-out mechanism according to the present invention.
Figure 2:
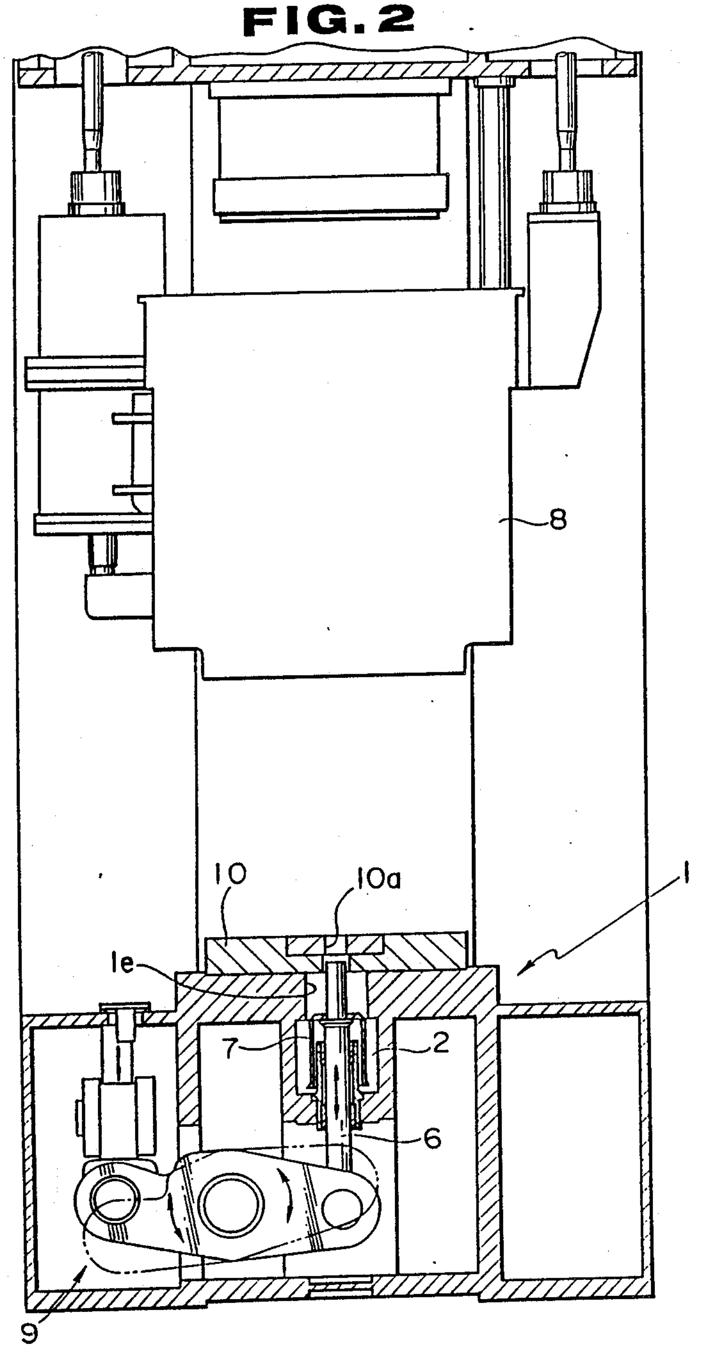
FIG. 2 is a schematic side view of a press machine employing the mold lubricant exhausting apparatus for the knocking-out mechanism.

FIG. 2 schematically showing a press machine employing the mold lubricant exhausting apparatus for a knocking-out mechanism according to the present invention. The press machine has a reserving chamber 2 in a bed 1. The reserving chamber 2 is defined, as shown in FIG. 1, by a ceiling plate 1*a* of the bed 1, a holder 1*c* laterally installed between the ceiling plate 1*a* and a bottom plate 1*b*, and a side wall 1*d* connected to and disposed between the peripheral edge of the holder 1*c* and the ceiling plate 1*a*, and is provided at a substantially central position of the ceiling plate 1*a*. The reserving chamber 2 has an exhaust port 2*a* opened at a part of the sidewall 1*d*, a bottom surface 2*b* is inclined downwardly toward the exhaust port 2*a*, and an opening 2*c* formed at the center of the bottom surface 2*b*. The opening 2*c* is perforated toward downward in a vertical direction (an elevational direction in the drawing) to engage a guide 4 through an O-ring 3. The guide 4 is defined in a cylindrical shape having a collar 4*a* on its lower outer peripheral surface. The collar 4*a* is disposed on the bottom surface 2*b* of the reserving chamber 2, its upper end being projected in the reserving chamber 2 to be fixed to the holder 1*c*. A knock-out bar 6 is inserted through annular bushes 5 and 5 into the guide 4. The knock-out bar 6 has a cover 7 at the upper portion thereof, and its lower end is contacted, as shown in FIG. 2, with a link 9 so as to vertically move in the guide 4 as the slide 8 moves. As shown in FIG. 1, the cover 7 of the knock-out bar 6 is formed with its section being in an inverted U shape, and is disposed in the reserving chamber 2 such that it always covers the upper opening end of the guide 4 irrespective of the vertical movements of the knock-out bar 6. Inserting holes 1*e* and 10*a* are respectively perforated in the ceiling plate 1*a* of the bed 1 and a bolster 10 fixed on the ceiling plate 1*a*, at the portions corresponding to the moving areas of the knock-out bar 6 and the cover 7.

The press machine has a nozzle 11 at the sidewall 1d of the reserving chamber 2. The nozzle 11 is disposed at a position opposed to the exhaust port 2*a* of the reserving chamber 2 with a fore end thereof communicating with the reserving chamber 2 toward the exhaust port 2*a*. An outlet 12*a* of a solenoid switching valve (valve means) is connected to the base end of the nozzle 11. The switching valve 12 is connected at an inlet 12*b* thereof to an air pump 13 and at another inlet 12*c* thereof to a water pump 14 to selectively connect these two pumps 13 and 14 to the nozzle 11. In a normal state the air pump 13 is connected to the nozzle 11 to inject air from the nozzle 11 to the reserving chamber 2.

Reference numeral 15 in FIG. 1 designates a passage defined under the exhaust port 2a of the reserving chamber 2.

When the press machine constructed as described above performs warm forging, the solenoid switching valve 12 is held in the normal state to always inject air from the nozzle 11. A product in a mold (not shown) installed on the bolster 10 is pushed out from the mold whenever the slide 8 moves at one stroke by means of the vertical movements of the knock-out bar 6 interlocked to the slide 8. A mold lubricant overflowed from the mold and a material during a molding work is temporarily gathered through the opening 10a of the bolster 10 and the opening 1e of the bed 1 into the reserving chamber 2, and is then exhausted outward of the bed 1 through the exhaust port 2a and the passage 15.

At this time, in this embodiment, the bottom surface 2b of the reserving chamber 2 is inclined downwardly toward the exhaust port 2a, and air is supplied from the air pump 13 to the nozzle 11. Accordingly, the lubricant in the reserving chamber 2 is forcibly exhausted preventing accumulation of lubricant on the bottom surface 2b. Thus, there is no possibility that the knock-out bar 6 is dipped in the mold lubricant, and there is accordingly no possibility that the mold lubricant is seized between the knock-out bar 6 and a member of the bed 1. Since the knock-out bar 6 has the cover 7, the mold lubricant dropped from the opening 10a of the bolster 10 and the hole 1e of the bed 1 is not adhered to the sliding portion between the knock-out bar 6 and the guide 4.

Further, since the mold lubricant of the reserving chamber 2 is forcibly exhausted by means of injected air and the inclination of the bottom plate 2b, there is no possibility that the ratio among ingredients in the mold lubricant to be exhausted and that in the mold lubricant to be supplied is inconsistent. Therefore, when the passage 15 is connected to a tank (not shown) for the mold lubricant, the mold lubricant can be circulated for repeated use.

In the press machine, when the solenoid switching valve 12 is operated to connect the nozzle 11 to the water pump 14, water is injected from the nozzle 11 to clean the interior in the reserving chamber 2 and the knock-out bar 6 after the warm forging is completed. More specifically, when the mold lubricant adhered to the reserving chamber 2 and the knock-out bar 6 during the molding work is allowed to stand for as it is after the work is completed, there is a possibility that the mold lubricant is plasticized at that position or is dropped to the bottom surface 2b of the reserving chamber 2 where it is plasticized and adhered. Thus, next molding work cannot be smoothly executed unless the lubricant is cleaned with water. When the opening 15a of the passage 15 is opened in case of cleaning, it can prevent the water from being introduced into the tank (not shown) after cleaning.

As described above, the mold lubricant exhausting apparatus for the knocking-out mechanism according to the present invention is advantageous to prevent the knock-out mechanism for the press machine from being damaged even using the lubricant.

What is claimed:

1. A mold lubricant exhausting apparatus for a knockingout mechanism in which mold lubricant overflowed along a knock-out bar and accumulated in a bed is led into a reserving chamber formed around said knock-out bar to exhaust said mold lubricant through an exhaust port provided at said reserving chamber comprising:
   - a nozzle disposed at an end thereof in said reserving chamber;
   - an air pump connected to a base end of said nozzle for supplying air to said nozzle for forcibly exhausting said mold lubricant accumulated in said reserving chamber;
   - a water pump for supplying water to said nozzle for cleaning the mold lubricant accumulated in said reserving chamber; and
   - valve means for selectively connecting said water pump and said air pump to said nozzle.

2. The mold lubricant for a knocking-out mechanism as claimed in claim 1 wherein said knock-out bar comprises a cover for covering a sliding portion of said knock-out bar in said reserving chamber.

3. The mold lubricant for a knocking-out mechanism as claimed in claim 1 wherein said reserving chamber has a bottom surface which is inclined downwardly toward said exhaust port.

* * * * *